Dec. 11, 1962 J. L. BONANNO Re. 25,295
TOY RAILROAD CAR WITH OPERATING SEARCH LIGHT
Original Filed Oct. 28, 1953 2 Sheets-Sheet 1
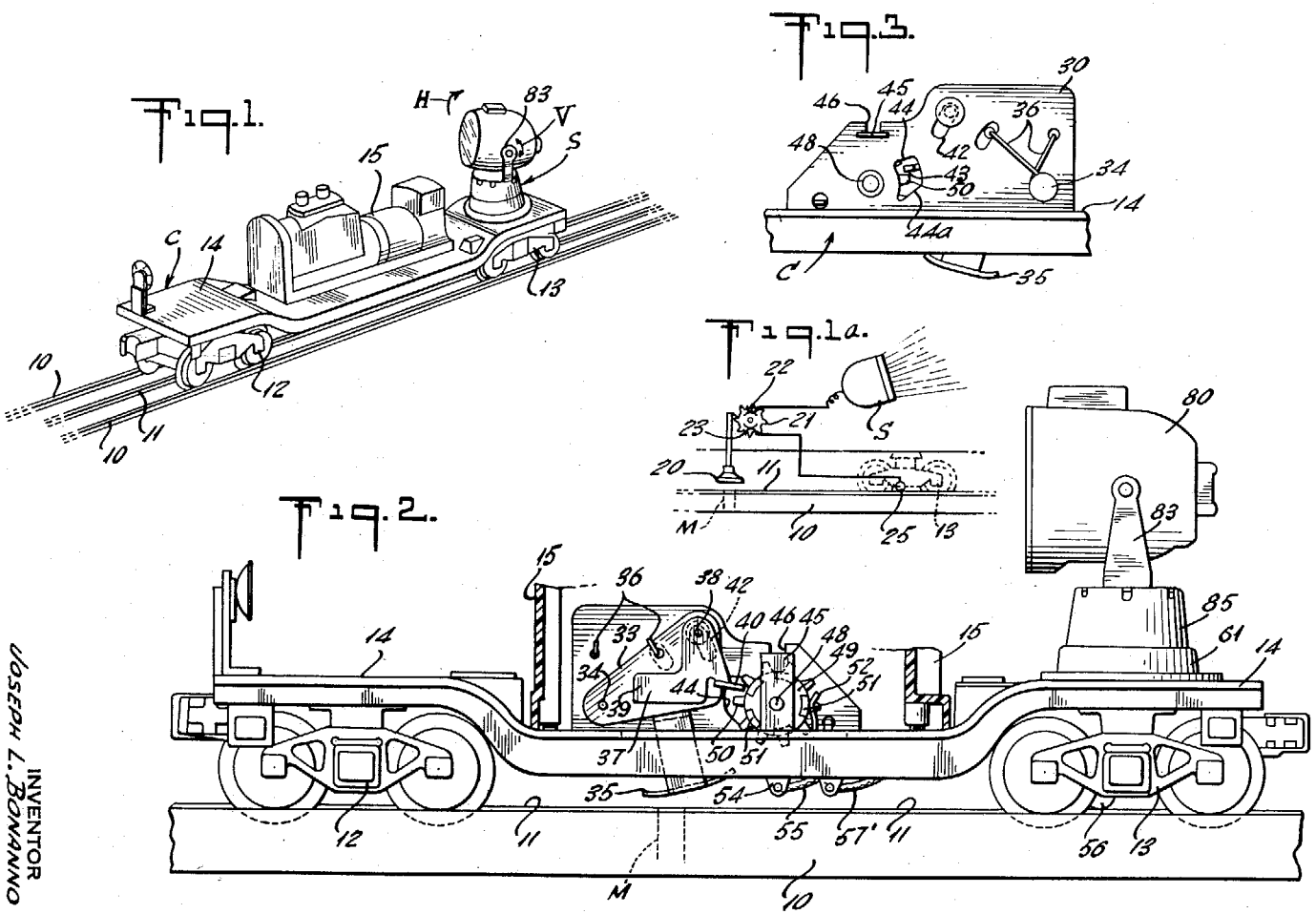
INVENTOR
JOSEPH L. BONANNO
BY John M. Cole
ATTORNEY TOY RAILROAD CAR WITH OPERATING SEARCH LIGHT
Original Filed Oct. 28, 1953 2 Sheets-Sheet 2
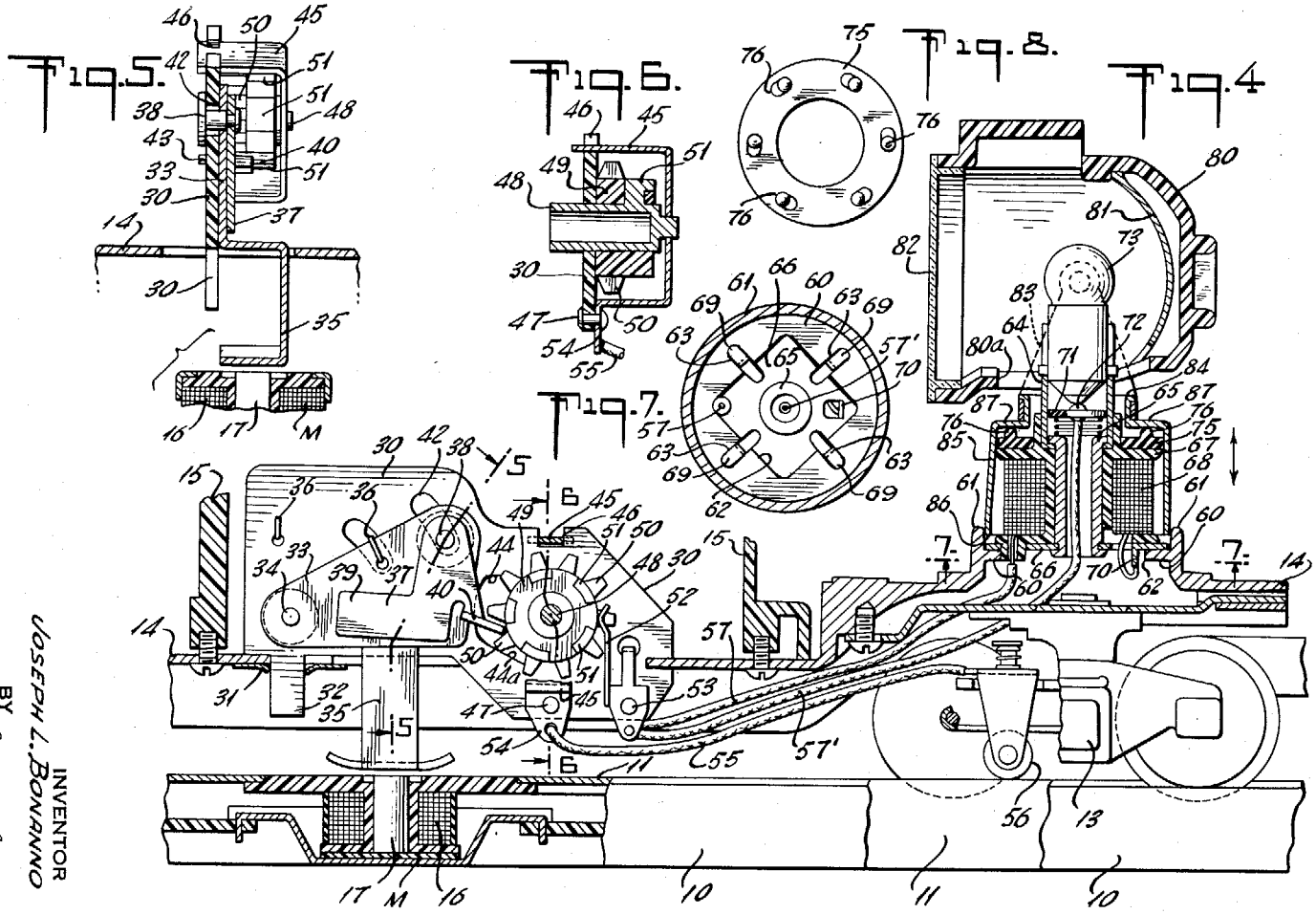
INVENTOR
JOSEPH L. BONANNO
BY
John M. Cole
ATTORNEY United States Patent Office Re. 25,295
Reissued Dec. 11, 1962

25,295

TOY RAILROAD CAR WITH OPERATING SEARCH LIGHT

Joseph L. Bonanno, South Orange, N.J., assignor to The Lionel Corporation, New York, N.Y., a corporation of New York Original No. 2,990,644, dated July 4, 1961, Ser. No. 388,741, Oct. 28, 1953. Application for reissue Apr. 9, 1962, Ser. No. 186,615
9 Claims. (Cl. 46—226)

Matter enclosed in heavy brackets [ ] appears in the original patent but forms no part of this reissue specification; matter printed in italics indicates the additions made by reissue.

The present invention relates to toy railroad cars with operating search lights and is more particularly directed to search light cars having devices for remote control of the search light.

In my earlier Patent #2,574,905, of November 13, 1951, was shown a toy railroad car with a search light which could be manually adjusted to selected vertical and horizontal angles and lighted when the car was on the track.

The present application is a continuation-in-part of my application Serial No. 89,290, filed April 23, 1949, now Patent No. 2,661,852, dated December 8, 1953.

The present invention relates to improvements in search light cars according to which it is possible to effect the lighting and extinguishment of the lamp in the search light at will by remote control when the car is on the track. It also contemplates a toy search light car in which it is also possible to obtain continued turning of the search light about a vertical axis as long as the lamp is lit.

To carry out the above objects the car is designed for use with three-rail toy railroad track having a track magnet. The car is provided with an armature adapted to be attracted by the track magnet and this armature actuates a switch in the circuit of the lamp to turn the lamp on and off at successive energizations of the track magnet. The car can move away from the track magnet and maintain the circuit condition for the lamp as the car travels around the toy track layout.

The rotation of the search light beam about the vertical axis is, according to the present invention, secured by a vibrating magnet and elastic member having fingers on which the search light body is supported. The vibrator magnet is in parallel with the lamp and when energized by alternating current sets up a current which causes the headlight body to rotate.

In the accompanying drawings two forms of the invention are shown:

FIGURE 1 is a perspective view of a toy search light car on toy track;

FIGURE 1a is a diagrammatic view illustrating one form of construction for energizing the search light lamp;

FIGURE 2 is a side elevational view of the toy search light car with another form of track magnet operated switch in circuit closing position, the track magnet being de-energized;

FIGURE 3 is a view of the switch taken in a direction opposite that of FIGURE 2;

FIGURE 4 is a longitudinal sectional view through the toy car at enlarged scale showing the construction of the search light and the relations of the track magnet operated switch with the magnet in the track;

FIGURES 5, 6 and 7 are sectional views on lines 5—5, 6—6 and 7—7, respectively, of FIGURE 4; and FIGURE 8 is a top plan view of the compressible washer which propels the rotatable search light head.

FIGURE 1 illustrates a toy search light car adapted to operate on conventional toy railroad track having wheel bearing rails 10—10 and power rail 11. The car C has wheeled trucks 12 and 13, a platform 14 on which is secured a toy diesel engine 15, and a toy search light generally indicated at S. The toy track is preferably of the construction shown in my application Serial No. 89,290, now Patent 2,661,852, above referred to. The track carries a track magnet M having a coil 16 and magnetizable core 17. This magnet can be energized as illustrated in the above patent.

FIGURE 1a shows an arrangement wherein the armature 20 above the magnet M acts on a ratchet drum 21 to advance it one-eighth of a revolution. The ratchet drum carries a commutator with contacts 22 and 23, one of which is connected to the search light generally indicated at S, while the other is connected to a roller 25 carried by the truck 13 bearing on the power rail so that the lamp may be turned on and off by energizing the track magnet when the car is located so as to place the armature 20 over the track magnet M.

FIGURES 2 to 8, inclusive, show a complete embodiment of the search light and its controls. Here the armature operated switch and control is illustrated in a form in which all the parts are secured to a vertical insulating plate 30 adapted to be secured to the platform 14 by a spring fastener indicated at 31, which engages a prong 32 extending downwardly from the insulating plate 30. An arm 33 is pivotally secured at 34 to the plate 30. This arm is made of magnetizable material and has a depending, foot-like member 35 which extends down near enough to the track level to be attracted by the magnet M when directly over this magnet.

The arm 33 is biased to the "up" position as in FIGURES 2 and 3 by a spring 36. The arm 33 carries a pawl 37 pivoted to it at 38. The pawl has a weighted tail 39 which biases it counterclockwise and is provided with a nose-forming flange 40 extending to the right, as shown in FIGURES 2 and 3. The extent of movement of the arm 33 is determined by the lengh of the slot 42 through which the pivot pin 38 passes. The flange 40 extends rearwardly as indicated at 43 in FIGURE 5, and passes through a slot 44 in the plate 30. The slot has a beveled lower surface 44a against which the pawl extension 43 is brought.

The insulating plate 30 carries a metal bridging member 45 secured in a notch 46 in the plate 30 and by a rivet 47. This bridging member 45 and plate 30 support a metal rotor 48 which forms an insert in a plastic molding 49. The rotor is formed to provide a 6-segment commutator 51 and the molding 49 is formed to provide a 12-toothed gear 50 and to fill in between the commutator segments. A spring contact member 52 is secured by a rivet 53 to the insulating plate 30 in a position to bear on the face of the rotor and make contact with the metal segments. When the armature 35 is released the parts are in the position shown in FIGURES 2 and 3, and when the armature is energized, it is pulled down as indicated in FIGURE 4 and the rotor 49 advances one tooth. This will shift the rotor from contact making position as in FIGURE 2, to open circuit position, as shown in FIGURE 4.

De-energization of the track magnet or moving the car away from the track magnet merely permits the armature and parts carried by it to rise without affecting the circuit previously established.

The lower end 54 of the bridging member 45 is connected by wire 55 with the current collector 56 of the usual construction, carried by the truck 13. The lower end of the contact 52 is connected by wires 57 and 57' with the lamp and vibrator coil in a manner to be described.

The right hand end of the platform 14 as shown in FIGURE 4 is provided with a raised seat 60 and a cylindrical flange 61 above this seat. The wall of the platform 14 is provided with an opening 62, see FIGURE 7. This opening is shown as square and has four notches indicated at 63. This platform is adapted to receive the stationary parts of the search light assembly. This search light assembly includes a lamp socket shell 64 of the bayonet socket type, a magnetizable tube 65 and magnetizable bottom plate 66. The tube 65 receives the spool or coil form 67 on which is wound a vibrator coil 68. The plate 66 has four outwardly bent prongs 69 entering the slots 63 so as to hold the assembly to the car platform. The wire 57 above referred to leads to the coil 68. The other end of the coil 68 is grounded to a soldering lug 70 carried by the plate 66. The wire 57' extends up through a washer 71 which carries center contact 72 for the lamp 73.

The upper face of the coil form 67 provides a flat, annular platform to receive a washer 75, made of a soft, rubber-like formulation and provided with integral, upwardly and obliquely extending projections 76. These all lean in the same direction away from the radial line extending through them.

The search light housing is indicated at 80. It has a hole 80a to accommodate the lamp socket. It is made of opaque plastic material, and carries a metal reflector 81 and a transparent cover 82. It is pivotally mounted on upwardly extending arms 83 of a bracket 84. This bracket is secured to a magnetizable cover 85 which extends down about the rubber washer 75 and the coil 68. Its lower edge 86 is inside the cyclindrical riser 61. The cover 85 has a flat, downwardly facing surface 87 which rests on the soft fingers 76 of the washer 75.

The search light housing 80 and bracket 84 and cover 85 may readily be removed from the position shown in FIGURE 4 for shipment. When the parts are in the position shown in FIGURE 4, the search light housing and cover are supported on the fingers as above mentioned, and the cover 85 is inside the flange 61 so that the loose part is securely held in place as the car moves along the track.

When current is supplied from the power rail through the control switch to the lamp and the coil 68, the lamp is lighted and the coil energized so as to vibrate at the frequency of the alternating current. This vibration is communicated to the search light housing and as the load on the fingers 76 varies up and down, these fingers stretch and compress and impart a rotary movement to the cover 85 and search light housing so that a rotating beam is produced about the lighted lamp. The rotation of the rotating beam is indicated in FIGURE 1 by the arrow H and the vertical adjustment of the housing about the horizontal is indicated by the arrow V, FIGURE 1.

Since it is understood that the invention may be embodied in other forms and constructions within the scope of the claims, I wish it to be understood that the particular form shown is but one of these forms, and, various modifications and changes being possible, I do not otherwise limit myself in any way with respect thereto.

What is claimed is:

1. A toy search light car having wheeled trucks one of which has a current collector, a metal car platform supported from the trucks and having a preassembled toy search light stator symmetrical about a vertical axis and comprising a lamp socket shell, a coil form having an upwardly facing seat below the socket shell, a vibrator coil in the coil form, a bottom plate below the coil form and to which one side of the coil is connected, a magnetizable tube passing through the coil form and securing the socket shell and bottom plate together, means to secure the search light stator to the car platform to ground the coil and socket shell, wiring connecting the other contact of the socket and the other side of the coil to the current collector, a ring made of elastomeric material resting in the coil form and having upwardly extending, tangentially leaning, oblique fingers, and a toy search light rotor having a hood about the lamp socket, a magnetizable skirt about the stator, a flat annular under surface resting on the fingers and adapted to compress and to release the fingers when the coil is energized by alternating current.

2. The toy search light car of claim 1 having a car carried switch between the current collector and the lamp and coil circuits, and a switch operator including a car carried armature for operating the switch and disposed in position to be actuated by a track carried magnet below the same.

3. A rotating toy search light having a fixed, preassembled stator symmetrical about a vertical axis and comprising a lamp socket shell, a coil form having an upwardly facing seat below the socket shell, a vibrator coil in the coil form, a bottom plate below the coil form and to which one side of the coil is connected, a magnetizable tube passing through the coil form and securing the socket shell and bottom plate together, wiring connecting the other contact of the socket and the other side of the coil to a power source, a ring made of elastomeric material resting in the coil form and having upwardly extending tangentially leaning, oblique fingers, and a top search light rotor having a hood about the lamp socket, a magnetizable skirt about the stator, a flat annular under surface resting on the fingers, and adapted to compress and to release the fingers when the coil is energized by alternating current.

4. A toy railroad car for use with a toy railroad track having wheel bearing and power rails and having an electromagnet adjacent said rails, comprising wheeled means for moving the car over the tracks including a current collector maintained in contact with said power rail, an upwardly biased armature downwardly movable when attracted by the electromagnet when said armature is positioned thereover, a switch on said car in series with said current collector and connected to said armature and movable thereby alternately into an opened and closed position, and a search light electrically connected to said switch.

5. A railroad car according to claim 4, wherein said search light is rotably mounted on said car, an electromagnetic coil electrically connected in parallel with said search light, and a vibration device including a magnetic portion operatively associated with said electromagnetic coil for vibration thereby and including means to effect rotation thereof during vibration, said magnetic portion being connected to said search light, whereby said device is rotated by said eletcromagnetic coil upon energization of the latter to effect a similar rotation of said search light.

6. A toy railroad car having wheeled trucks and a current collector cooperable with a three-rail toy railroad track, a car carried armature biased to one position and attractable to a second position by a track carried magnet, a car carried current consuming device connected to said current collector, and a switch connected to said armature and movable into an opened and closed position by successive attraction operations of the armature and remaining in set position when the armature is released whereby the current consuming device is energized as the car moves on the track.

7. *A rotating toy having a fixed, preassembled stator symmetrical above a vertical axis and comprising coil securing means including an upwardly facing seat, a vibrator coil beneath said seat, a bottom plate below the coil and to which one side of the coil is connected, a magnetizable tube passing through the coil and secured to the bottom plate, wiring connecting the other side of the coil to a power source, a ring made of elastomeric material resting on said seat and having leaning, oblique fingers, and a toy search light rotor having a hood about said coil securing means, a magnetizable skirt about the stator, and*

*a flat, annular undersurface resting on the fingers, said undersurface being adapted to compress and to release the fingers when the coil is energized by alternating current.*

*8. A rotating toy having a fixed, preassembled stator symmetrical above a vertical axis and comprising a lamp socket shell, coil securing means including an upwardly facing seat below the socket shell, a vibrator coil beneath said seat, a bottom plate below the coil and to which one side of the coil is connected, a magnetizable tube passing through the coil and securing the socket shell and the bottom plate together, wiring connecting the other contact of the socket and the other side of the coil to a power source, a ring made of elastomeric material resting on said seat and having leaning, oblique fingers, and a toy search light rotor having a hood about the lamp socket, a magnetizable skirt about the stator, and a flat, annular undersurface resting on the fingers, said undersurface being adapted to compress and to release the fingers when the coil is energized by alternating current.*

*9. A rotating toy search light comprising a magnetizable core, a lamp socket shell secured to the top of said core with its outer contact surface in electrical conducting relationship with said core, a non-magnetic annular seat surrounding said core toward the top thereof, a magnetizable annular bottom plate secured to the lower portion of said core, a coil wound around said core between*

*said seat member and said bottom plate, one end of said coil being in electrical contacting relationship with said bottom plate, electrical wiring passing through the center of said core and connected to the other contact of said socket shell, additional wiring connected to the other end of said coil, a ring member made of elastomeric material resting on said seat and including leaning, oblique fingers, and a toy search light rotor having a hood about the lamp socket, a magnetizable skirt about the stator, and a flat annular undersurface supported on the fingers, said rotor being adapted to compress and to release said fingers when the coil is energized by alternating current.*

References Cited in the file of this patent or the original patent

UNITED STATES PATENTS

| | | |
|---|---|---|
| 701,410 | Smith | June 3, 1902 |
| 1,601,014 | Wismer et al. | Sept. 28, 1926 |
| 1,601,247 | Garbarini | Sept. 28, 1926 |
| 1,774,697 | Bodoh | Sept. 2, 1930 |
| 1,833,156 | Davis | Nov. 24, 1931 |
| 2,196,319 | McLoughlin | Apr. 9, 1940 |
| 2,288,792 | Daniels | July 7, 1942 |
| 2,292,565 | Jordan | Aug. 11, 1942 |
| 2,302,076 | Van Loo | Nov. 17, 1942 |
| 2,574,905 | Bonanno | Nov. 13, 1951 |